United States Patent
Tanaka

(10) Patent No.: US 9,063,820 B2
(45) Date of Patent: Jun. 23, 2015

(54) NON-TRANSITORY COMPUTER READABLE MEDIUM STORING INSTRUCTIONS FOR UPDATE MANAGEMENT, UPDATE MANAGEMENT DEVICE, AND IMAGE PROCESSING SYSTEM

(71) Applicant: Tsutomu Tanaka, Nagoya (JP)

(72) Inventor: Tsutomu Tanaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/191,948

(22) Filed: Feb. 27, 2014

(65) Prior Publication Data

US 2014/0245283 A1  Aug. 28, 2014

(30) Foreign Application Priority Data

Feb. 28, 2013 (JP) ................. 2013-038999

(51) Int. Cl.
*G06F 9/44* (2006.01)
*G06F 9/445* (2006.01)

(52) U.S. Cl.
CPC ...................... *G06F 8/65* (2013.01)

(58) Field of Classification Search
CPC ........................................ G06F 8/65
USPC ................................ 717/168, 174
See application file for complete search history.

(56) References Cited

U.S. PATENT DOCUMENTS

| 8,250,564 | B2 | 8/2012 | Bando et al. | |
|---|---|---|---|---|
| 2003/0035139 | A1* | 2/2003 | Tomita et al. | 358/1.15 |
| 2004/0095602 | A1* | 5/2004 | Sugishita et al. | 358/1.16 |
| 2005/0084236 | A1* | 4/2005 | Itoh | 386/46 |
| 2005/0141025 | A1* | 6/2005 | Hanada | 358/1.15 |
| 2006/0232816 | A1* | 10/2006 | Konno | 358/1.15 |
| 2007/0201092 | A1* | 8/2007 | Okutsu et al. | 358/1.16 |
| 2008/0148268 | A1 | 6/2008 | Hirouchi | |
| 2008/0263538 | A1 | 10/2008 | Bando et al. | |
| 2009/0225364 | A1* | 9/2009 | Sato | 358/1.15 |
| 2009/0235242 | A1* | 9/2009 | Kawaguchi | 717/168 |
| 2009/0303526 | A1* | 12/2009 | Kobayashi et al. | 358/1.15 |
| 2011/0087793 | A1* | 4/2011 | Akiyama | 709/230 |
| 2011/0222098 | A1* | 9/2011 | Fukuda | 358/1.13 |

FOREIGN PATENT DOCUMENTS

| JP | 2004-110396 A | 4/2004 |
|---|---|---|
| JP | 2006-092278 A | 4/2006 |
| JP | 2008-152482 A | 7/2008 |

(Continued)

*Primary Examiner* — Phillip H Nguyen
(74) *Attorney, Agent, or Firm* — Banner & Witcoff, Ltd.

(57) ABSTRACT

A non-transitory computer readable medium stores an update management program for causing an update on control program, which is installed on each of image processing devices. The update management program, when executed by a processor, causes the computer to: acquire an update program and update function information regarding functions to be updated by the update program from a firmware distribution server; acquire device function information regarding functions of each image processing device from the each image processing device; transmit the update program to the each image processing device; determine an update sequence of timing for causing the each image processing device to update its control program, based on the acquired update function information and the acquired device function information; and cause the each image processing device to update its control program by executing the transmitted update program in accordance with the determined update sequence of timing.

15 Claims, 12 Drawing Sheets

(56) References Cited

FOREIGN PATENT DOCUMENTS

| | | |
|---|---|---|
| JP | 2008-269226 A | 11/2008 |
| JP | 2009-129333 A | 6/2009 |
| JP | 2010-170496 A | 8/2010 |
| JP | 2012-003529 A | 1/2012 |

* cited by examiner

FIG.4

DEVICE MANAGEMENT TABLE 42

| NODE # | MODEL NAME | FUNCTION | | | | | | | |
|---|---|---|---|---|---|---|---|---|---|
| | | COLOR COPY | | B & W COPY | | FAX | | EMAIL | |
| | | E/D | # OF USERS | E/D | # OF USERS | E/D | # OF USERS | E/D | # OF USERS |
| 1 | MFP1 | E | 35 | E | 50 | E | 50 | E | 10 |
| 2 | MFP1 | E | 100 | E | 150 | D | – | D | – |
| 3 | MFP1 | D | – | D | – | E | 30 | D | – |
| 4 | MFP1 | D | – | E | 30 | D | – | E | 20 |
| 5 | MFP2 | E | 20 | – | – | – | – | – | – |

FIG.5

UPDATE SEQUENCE MANAGEMENT TABLE 43

| NODE # | HIGHEST LEVEL | # OF USERS |
|---|---|---|
| 2 | 1 | 100 |
| 1 | 1 | 50 |
| 5 | 1 | 30 |
| 4 | 3 | 20 |
| 3 | 4 | 30 |

FIG.9A

FIRMWARE INFORMATION TABLE — 51

|  | MODEL NAME | FIRMWARE VER. | UPDATE FUNCTION | LEVEL OF IMPORTANCE |
|---|---|---|---|---|
| RECORD 1 | MFP 1 | 2.0.1 | ECO COPY | 1 |
| RECORD 2 |  |  | B & W COPY | 2 |

FIG.9B

DEFAULT FUNCTION TABLE — 52

| NODE # | MODEL NAME | DEFAULT SETTING OF COPY | DEFAULT SETTING OF ECO PRINT |
|---|---|---|---|
| 1 | MFP 1 | B & W COPY | REGULAR COPY |
| 2 | MFP 1 | B & W COPY | ECO COPY |
| 3 | MFP 1 | COLOR COPY | — |
| 4 | MFP 2 | — | REGULAR COPY |

FIG.9C

UPDATE SEQUENCE MANAGEMENT TABLE — 53

| NODE # | HIGHEST LEVEL |
|---|---|
| 2 | 1 |
| 1 | 2 |
| 3 | — |

FIG.10A

ERROR INFORMATION MANAGEMENT TABLE ~61

| NODE # | MODEL NAME | FUNC. HAVING ERROR | ERROR OCCURRENCE TIME |
|---|---|---|---|
| 1 | M F P 1 | B & W COPY | JANUARY 12, 2013, 11:47:28 |
| 2 | M F P 1 | COLOR COPY | JANUARY 10, 2013, 9:24:52 |
| 3 | M F P 1 | FAX | JANUARY 11, 2013, 14:04:31 |
| 4 | M F P 1 | — | — |
| 5 | M F P 2 | B & W COPY | JANUARY 8, 2013, 17:30:14 |

FIG.10B

UPDATE SEQUENCE MANAGEMENT TABLE ~62

| NODE # | HIGHEST LEVEL | ERROR OCCURRENCE TIME |
|---|---|---|
| 5 | 1 | JANUARY 8, 2013, 17:30:14 |
| 1 | 1 | JANUARY 12, 2013, 11:47:28 |
| 2 | 2 | JANUARY 10, 2013, 9:24:52 |
| 3 | 4 | JANUARY 11, 2013, 14:04:31 |
| 4 | — | — |

FIG.11A

FIRMWARE INFORMATION TABLE (71)

| | MODEL NAME | FIRMWARE VER. | TIME REQUIRED FOR UPDATE | UPDATE FUNC. | LEVEL |
|---|---|---|---|---|---|
| RECORD 1 | MFP 1 | 2.0.1 | 15 MIN. | B & W COPY | 1 |
| RECORD 2 | | | | FAX | 2 |

FIG.11B

SCHEDULED FUNCTION EXECUTION TABLE (72)

| NODE # | MODEL NAME | SCHEDULED FUNC. | SCHEDULED TIME |
|---|---|---|---|
| 1 | MFP 1 | FAX | JANUARY 20, 2013, 2:00 |
| 2 | MFP 1 | FAX | JANUARY 19, 2013, 12:15 |
| 3 | MFP 1 | B & W COPY | JANUARY 18, 2013, 1:00 |
| 4 | MFP 1 | — | — |

FIG.12A

UPDATE SEQUENCE MANAGEMENT TABLE — 73

| NODE # | HIGHEST LEVEL | SCHEDULED TIME | DIFF B/W CURRENT TIME AND SCHEDULED TIME |
|---|---|---|---|
| 3 | 1 | JANUARY 18, 2013, 1:00 | W/IN 15 MIN. |
| 2 | 2 | JANUARY 19, 2013, 12:15 | LONGER THAN 15 MIN. |
| 1 | 2 | JANUARY 20, 2013, 2:00 | LONGER THAN 15 MIN. |
| 4 | — | — | |

FIG.12B

UPDATE SEQUENCE MANAGEMENT TABLE — 73

| NODE # | HIGHEST LEVEL | SCHEDULED TIME | DIFF B/W CURRENT TIME AND SCHEDULED TIME |
|---|---|---|---|
| 2 | 2 | JANUARY 19, 2013, 12:15 | LONGER THAN 15 MIN. |
| 1 | 2 | JANUARY 20, 2013, 2:00 | LONGER THAN 15 MIN. |
| 3 | 1 | JANUARY 18, 2013, 1:00 | W/IN 15 MIN. |
| 4 | — | — | |

NON-TRANSITORY COMPUTER READABLE MEDIUM STORING INSTRUCTIONS FOR UPDATE MANAGEMENT, UPDATE MANAGEMENT DEVICE, AND IMAGE PROCESSING SYSTEM

CROSS REFERENCE TO RELATED APPLICATION

The application claims priority from Japanese Patent Application No. 2013-038999 filed on Feb. 28, 2013. The entire content of this priority application is incorporated herein by reference.

TECHNICAL FIELD

The present disclosure relates to technologies for updating a control program for controlling an image processing device.

BACKGROUND

Known is a management device, which is for transmitting firmware programs to printers. The management device sends the latest firmware program to the printers, and then each printer implements updating the firmware program. Several printers may be placed on the same floor of a company and connected with each other via local area network (LAN) so each user could have access to any printer on the floor. Since it takes considerable time that each printer updates the firmware program, no printer may be available if all printers on the floor simultaneously implement updating the firmware program.

SUMMARY

However, the known technologies described according to the background do not teach how to determine a sequence of updates indicating that the updates are performed from what printer and in what sequence.

This disclosure provides a technology how to determine a sequence of updates indicating that the updates are performed from what printer and in what sequence.

A non-transitory computer readable medium described herein stores an update management program. The update management program causes an update on a control program, which is installed on each of a plurality of image processing devices. The update management program, when executed by a processor, causes the computer to: acquire an update program and update function information regarding functions to be updated by the update program from a firmware distribution server; acquire device function information regarding functions of each image processing device from the each image processing device; transmit the update program to the each image processing device; determine an update sequence of timing for causing the each image processing device to update its control program, based on the acquired update function information and the acquired device function information; and cause the each image processing device to update its control program by executing the transmitted update program in accordance with the determined update sequence of timing.

With the update management program, updates on control programs installed on the image processing devices are performed in sequence from the image processing device that has the highest priority of the update to the image processing device that has the lowest priority of the update.

BRIEF DESCRIPTION OF THE DRAWINGS

FIG. 4 is a device management table.

FIG. 5 is an update sequence management table.

FIG. 9A is a firmware information table used in a firmware update process according to another aspect of the present invention.

FIG. 9B is a default function table used in the firmware update process.

FIG. 9C is an update sequence management table used in the firmware update process.

FIG. 10A is an error information management table used in a firmware update process according to another aspect of the present invention.

FIG. 10B is an update sequence management table used in the firmware update process.

FIG. 11A is a firmware information table according to another aspect of the present invention.

FIG. 11B is a scheduled function execution table.

FIG. 12A is one state of an update sequence management table.

FIG. 12B is another state of the update sequence management table.

DETAILED DESCRIPTION

According to technologies described herein, updates of control programs installed on image processing devices are performed in sequence of the image forming devices based on levels of priories of update.

One Illustrative Aspect

An illustrative aspect of the present invention will be described with reference to FIGS. 1 through 8.

1. Configuration of Image Processing System

An image processing system 1 according to an aspect of the present invention will be described with reference to FIG. 1. The image processing system 1 includes a management server 2 and multiple image processing devices 3A to 3E. The management server 2 and the image processing devices 3A to 3E are connected to the management server 2 via a local area network (LAN) 4 and configured to establish communication between them. Node numbers 1, 2, 3, 4 and 5 are assigned to the image processing devices 3A, 3B, 3C, 3D and 3E, respectively, for identification. The image processing devices 3A, 3B, 3C and 3D are multi-function devices having the model name of MFP 1. The image processing device 3E is a multi-function device having the model name of MFP 2.

Examples of the image processing device 3A to 3E includes printers, scanners, fax machines, and multifunction devices. Each printer includes a print function for processing printing jobs received from a terminal such as a personal computer. Each scanner includes an image scanning function for scanning documents and generating image data. Each fax machine includes a facsimile function for sending (faxes of) images. Each multifunction device includes multiple functions.

The functions of the multifunction device may include a print function, a scanner function, a fax function, a color copy function, a black-and-white (B & W) copy function, and an email function. The email function is a function for image data generated from document data using a scanner function and sending the image data via email. What functions are installed in an image processing device depends on a model of the image processing device.

Some of multifunction devices including color copy functions and black-and-white functions may have user setting functions that allow users to select normal copy settings or eco copy settings. The eco copy settings are for printing with fewer amounts of coloring agents such as tonner and ink by reducing the number of dots formed on print papers in comparison to the normal copy settings.

In the following description, when one of the image processing device 3A to 3E is referred without prejudice, the image processing device is denoted by 3. The image processing device 3 includes a nonvolatile memory that is rewritable such as a flash memory. A firmware program is stored in the memory. The image processing device 3 controls the functions thereof by executing the firmware program. The firmware program is an example of a control program.

Figure 1:
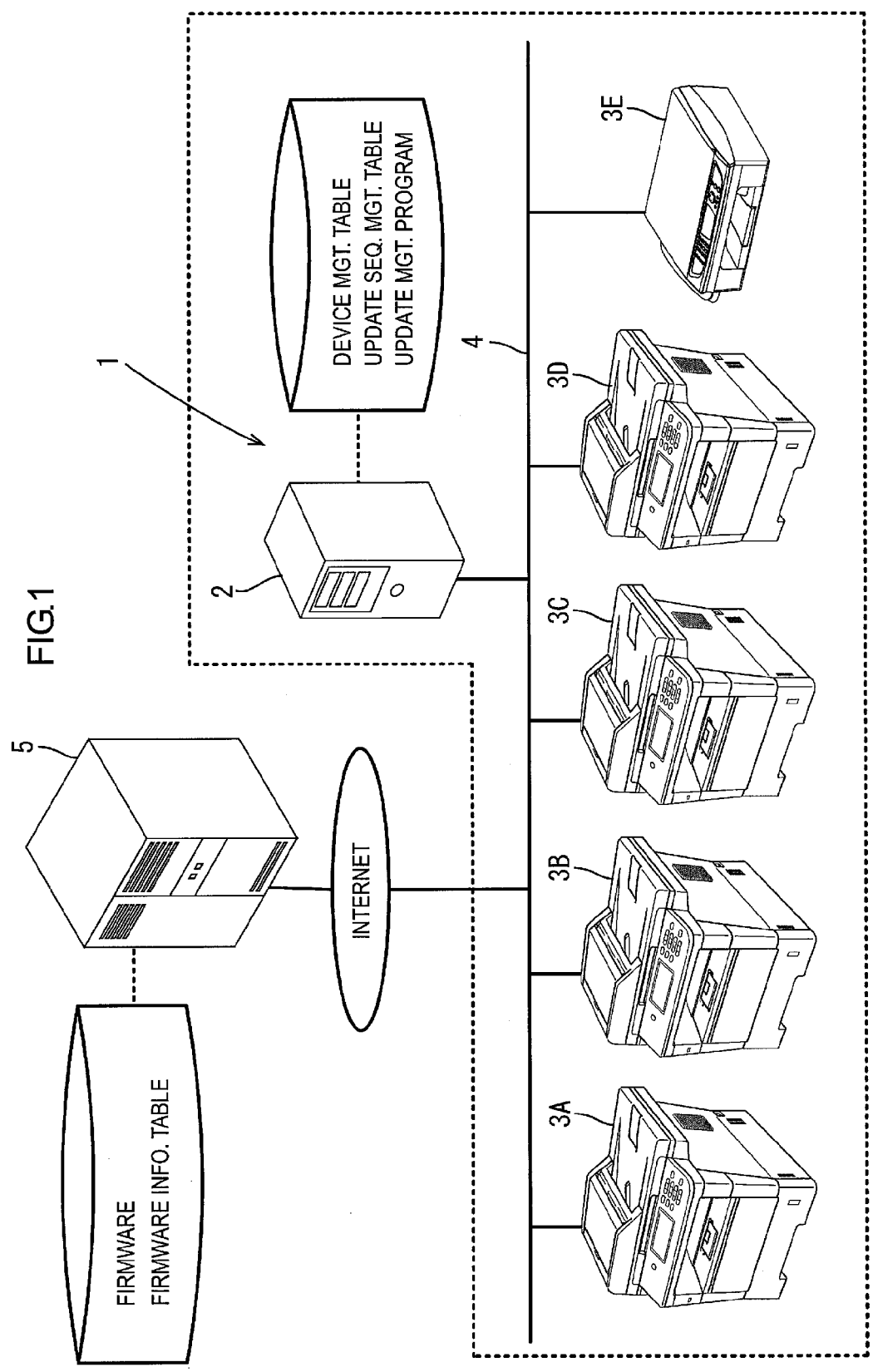
FIG. 1 is a schematic view illustrating a configuration of an image processing system according to an aspect of the present invention.

As illustrated in FIG. 1, the LAN 4 is connected to the internet. A firmware distribution server 5 is connected to the internet. The firmware distribution server 5 is a server controlled by a manufacturer of the image processing device 3. The firmware distribution sever 5 stores the latest firmware program for updating the firmware installed on the image processing device 3. The latest firmware program is an example of the update program.

The management server 2 is a server for managing updates of the firmware programs on the image processing device 3. The management server 2 is configured to download the latest firmware programs from the firmware distribution server 5 and to update the firmware programs on the image processing device 3 with the latest firmware program. The management server 2 is an example of a computer and an update management device.

2. Electrical Configuration of Management Server

Figure 2:
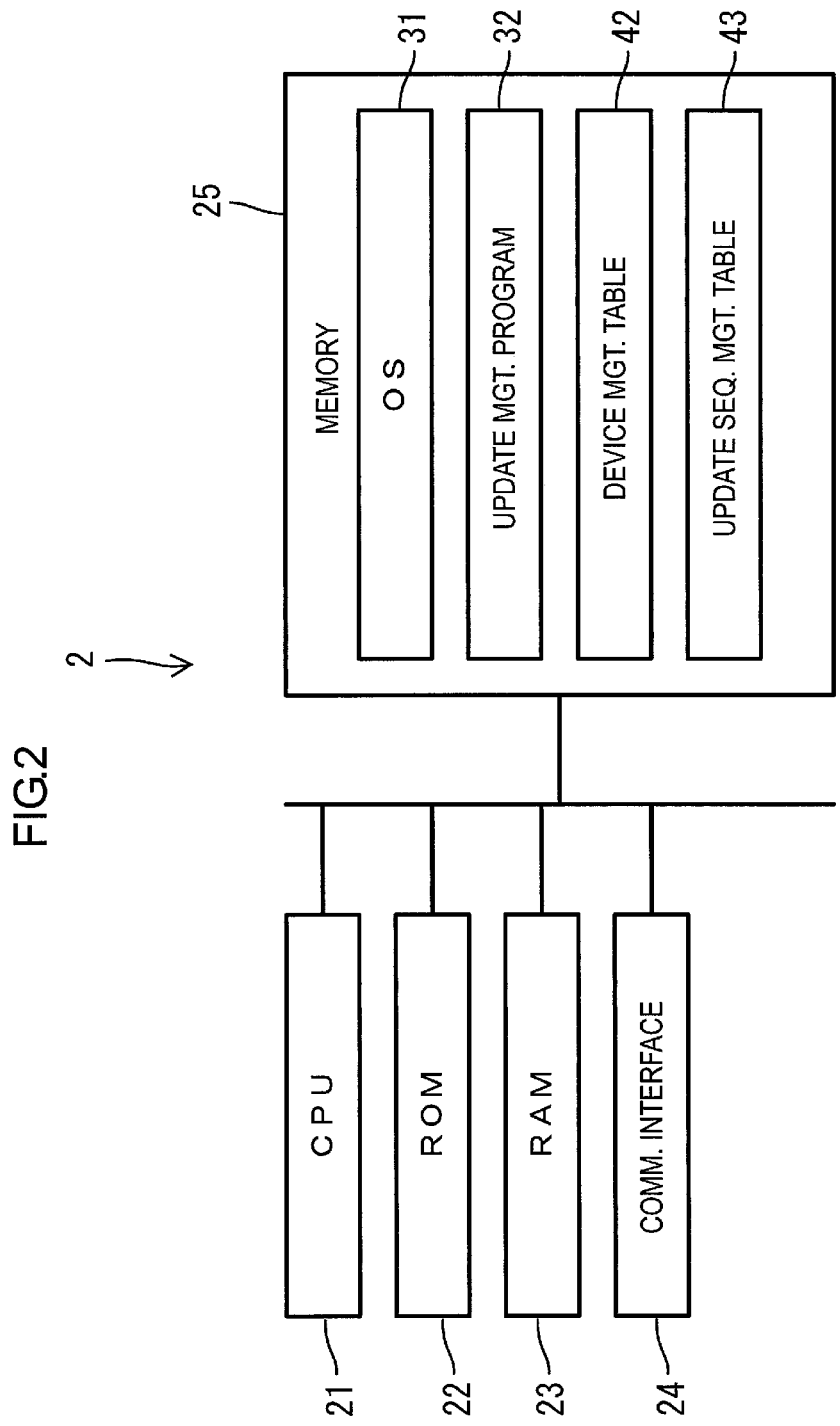
FIG. 2 is a block diagram illustrating a schematic electrical configuration of a management server.

An electrical configuration of the management server 2 will be described with reference to FIG. 2. The management server 2 includes a CPU 21, a ROM 22, a RAM 23, a communication interface 24, and a memory 25.

The CPU 21 controls components of the management server 2 by executing programs stores in the ROM 22 and the memory 25. The ROM 22 stores programs to be executed by the CPU 21 and data. The RAM 23 is a main memory device used in various processes performed by the CPU 21. The communication interface 24 includes hardware for communication with other devices via the LAN 4.

The memory 25 includes a nonvolatile memory, such as a hard disk and a flash memory, for storing various programs and data. The memory 25 stores an operating system (OS) 31, an update management program 32, a device management table 42, which will be described later, and an update sequence management table 43. The update management program 32 is a program for controlling the management server 2 to perform a process for updating the firmware programs on the image processing device 3.

3. Firmware Information Table

Figure 3:
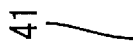
FIG. 3 is a firmware information table.

The firmware information table 41 stored in the firmware distribution server 5 will be described with reference to FIG. 3. Each row of the table in FIG. 3 contains a single record. For the purpose of illustration, the record numbers are assigned to records, respectively, in FIG. 3.

The firmware information table 41 contains a model name of the image processing devices 3A to 3E, the latest firmware versions, update functions controlled by the respective firmware programs that will be updated with the latest version of the firmware program, and levels of importance of the updates indicating how important the updates are for the update functions. The levels of importance are an example of importance of the functions.

For updating the firmware program to correct errors in the firmware program, a high level of importance is set for the function having an error that affects an execution result and a low level of importance is set for the function having an error that does not affect the execution result. The levels of importance are set with values 1 to 5. The value 1 indicates the highest level of importance and the value 5 indicates the lowest level of importance.

4. Device Management Table

The device management table 42 stored in the management server 2 will be described with reference to FIG. 4. Although the image processing device 3 has various functions, only some of the functions are present in FIG. 4.

The device management table 42 contains the node numbers and model names of the image processing devices 3A to 3E that are under management, enabled/disabled (E/D) statuses of the functions, and the numbers of users who are permitted to execute the functions. An administrator of the image processing device 3 sets the statuses of the functions "enabled (E)" to enable the functions. The administrator sets statuses of the functions "disabled (D)" to disable the functions. If the image processing device 3 does not include the function, symbol "-" is registered in the corresponding cell in the device management table 42. For each function, the administrator registers user IDs of users who are permitted to execute the function. The number of users indicates the number of user IDs registered in the image processing device 3. In each cell of the device management table 42 In FIG. 4 for the number of users of the function that is disabled, symbol "-" is placed. The information contained in the device management table 42 is acquired from the image processing device 3. The number of users who are permitted to execute the functions is an example of the amount of permitted users to execute the functions.

5. Printer Firmware Update Process

A printer firmware update process performed by the management server 2 will be described. To update the firmware programs on the image processing devices 3 with the latest firmware programs, the management server 2 acquires information on the functions controlled by the respective firmware programs that are to be updated with the latest firmware program from the image processing devices 3. Then, the management server 2 determines the update sequence of timing to perform the updates on the image processing devices 3 in descending sequence from the one having a higher priority of the update to the one having lower priority of the update based on the acquired information and predetermined determination criteria. Specifically, the management server 2 determines the update sequence as follows.

(a) The management server 2 determines whether the update functions are enabled and the update sequence such that the image processing device 3 that can execute the update functions has a higher priority than the image processing device 3 that cannot execute the update functions.

(b) The management server 2 determines the update sequence of the image processing devices 3 including the functions that are enabled based on the levels of importance of the updates such that the updates are performed on image processing devices 3 including the functions having the highest levels of importance with higher priorities. The highest level of importance is the level of importance of update which is the highest among the levels of importance of updates of the update functions within each image processing device 3.

(c) If the image processing device 3 includes the function having the highest level of importance the same as that of the other image processing device 3, the management server 2 determines the update sequence of these image processing devices 3 based on the number of users who are authorized to use the function. Namely, the management server 2 determines the update sequence such that the update is performed on the image processing device 3 including the function, the number of the authorized users of which is higher, earlier than the other.

5-1. Update Sequence Management Table

The update sequence management table 43 that contains information on the update sequence will be described with reference to FIG. 5. The update sequence management table 43 is a table created in the firmware update process, which will be described later. The firmware update process is a process performed by the management server 2 that executes the update management program 32.

The update sequence management table 43 contains the node numbers, the highest levels of importance, and the number of users of the image processing devices 3A to 3E on which the firmware updates are to be performed.

According to device management table 42 in FIG. 4, the enabled functions (i.e., the functions that are enabled) of the image processing device 3A having the node number 1 include the color copy function, the black-and-white copy function, the fax function, and the email function. According to the firmware information table 41 in FIG. 3, all these functions will be updated. In the case of the image processing device 3A having the node number 1, the value 1 that indicates the level of the importance of the update for the black-and-white copy function is registered as the highest level of importance, and the number 50 is registered as the number of users who are authorized to use the black-and-white function.

In the image processing device 3C having the node number 3 in the device management table 42 illustrated in FIG. 4, only the fax function is enabled. Therefore, the importance level 4 and the user number 30 of the fax function are registered as the highest level of importance and the number of users, respectively, for the image processing device 3C.

After records are registered for the respective node numbers in the update sequence management table 43, the management server 2 sorts the records in the update sequence management table 43 in ascending sequence of the values indicating the highest levels of importance, that is, in descending sequence of the levels of importance. The management server 2 further sorts the records in descending sequence of the numbers of users among those contacting the same level of importance. As a result, the update sequence management table 43 illustrated in FIG. 5 is created.

5-2. Flow of Firmware Update Process

Figure 6:
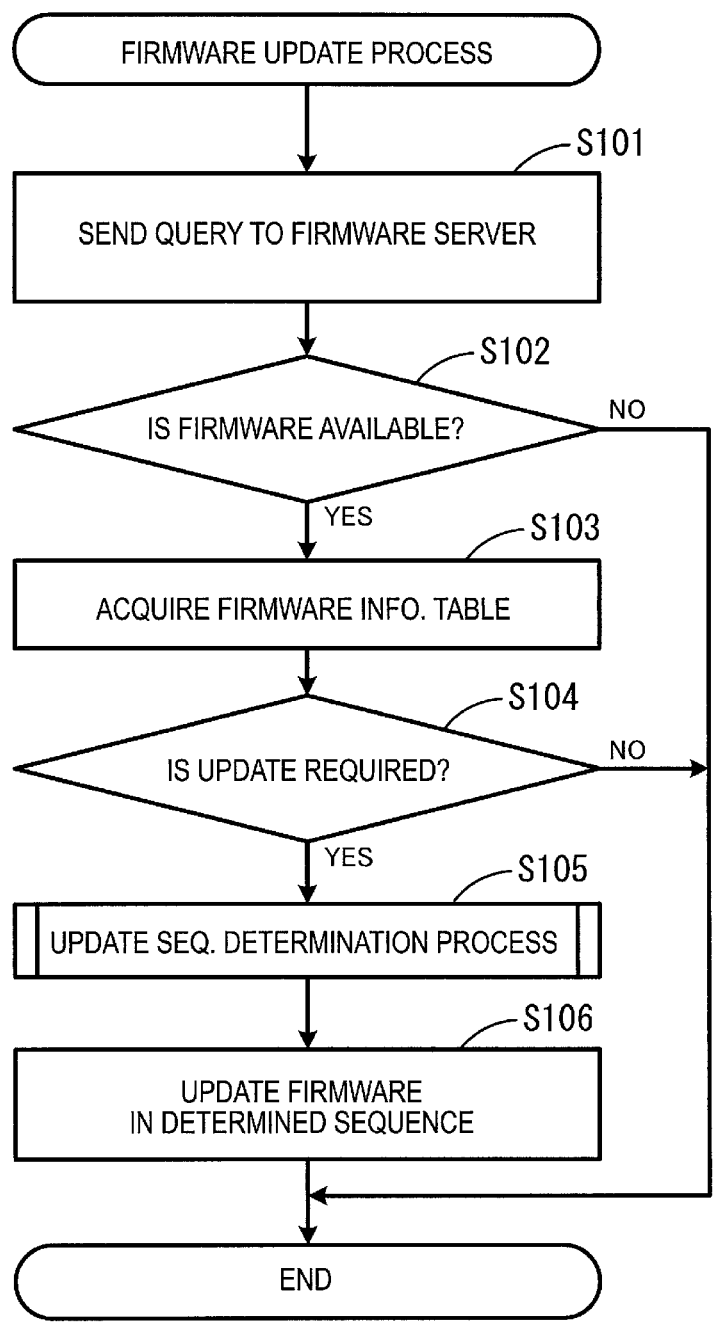
FIG. 6 is a flowchart illustrating a flow of a firmware update process.

A flow of the firmware update process performed by the management server 2 will be described with reference to FIG. 6. This process is repeated at predetermined time intervals, for example, per hour or per day.

In step S101, the management server 2 sends a query to the firmware distribution server 5 to determine whether the firmware program is available for distribution.

The firmware distribution server 5 determines whether the firmware information table 41 contains at least one record. If the firmware information table 41 contains at least one record, the firmware distribution server 5 sends a notification that indicates that the firmware program is available for distribution to the management server 2. If the firmware information table 41 contains no record, the firmware distribution server 5 sends a notification that indicates that no firmware program is available for distribution to the management server 2.

In step S102, the management server 2 determines whether the firmware program is available for distribution based on the notification from the firmware distribution server 5. If the firmware program is available for distribution, the management server 2 proceeds to step S103. If no firmware program is available for distribution, the management server 2 terminates the process.

In step S103, the management server 2 acquires the firmware information table 41 from the firmware distribution server 5.

In step S104, the management server 2 determines whether a firmware update on the image processing device 3 is required. Specifically, the management server 2 acquires the versions of the current firmware program from the image processing devices 3, the model names of which match the model names in the firmware information table 41. The management server 2 determines whether any of the acquired versions are older than the current version of the firmware program that is currently available for distribution. If any of the versions are older than the current version, the management server 2 determines that firmware updates are required. If all of the versions are not older than the current version, the management server 2 determines that no firmware update is required.

If the firmware updates are required, the management server 2 proceeds to step S105. If no firmware update is required, the management server 2 terminates the process.

In step S105, the management server 2 performs the update sequence determination process for creating the update sequence management table 43. The update sequence determination process will be described later in detail. Step S105 is an example of determination of update sequence.

In step S106, the management server 2 updates the firmware programs installed on the image processing devices 3, the firmware of which needs an update, with the latest firmware program in determined sequence, that is, from the top row to the bottom row of the update sequence management table 43 created in step S105.

To avoid the image processing devices 3A to 3E from being out of service at the same time, the updates of the image processing devices 3A to 3E may be performed in sequence such that the update on one image processing device 3 starts after the update on another image processing device 3 is complete.

The management server 2 may be configured to adjust timing of the updates such that at least one of the image processing devices 3A to 3E can be used to perform each function even if the updates are performed on some of the image processing devices 3A to 3E at the same time. Step S106 is an example of an update of the control program.

5-3. Update Sequence Determination Process

Figure 7:
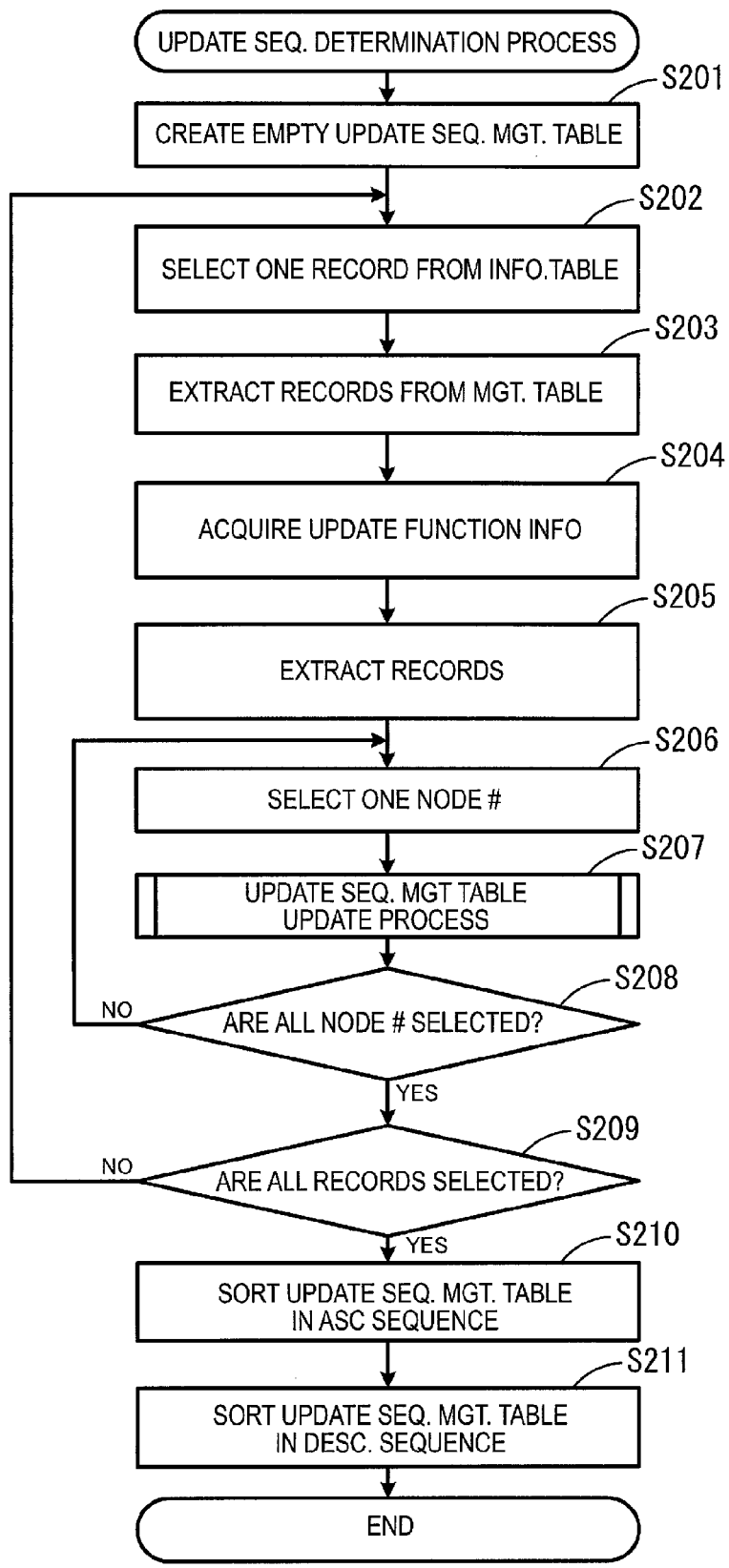
FIG. 7 is a flowchart illustrating a flow of update sequence determination process.

The update sequence determination process performed in step S105 will be described with reference to FIG. 7. The tables 41 to 43 will be used in this example.

In step S201, the management server 2 creates an empty update sequence management table 43.

In step S202, the management server 2 selects one record from the firmware information table 41.

In step S203, the management server 2 extracts records that contain the model name that matches the model name in the record selected in step S202. If the record selected in step S201 is record 1, the model name contained in the record 1 is MFP1. Therefore, records contain the node numbers 1 to 4 are extracted.

In step S204, the management server 2 acquires update function information on update functions contained in the records selected in step S202 from the firmware information table 41. For example, if the record selected in step S202 is the record 1, the management server 2 acquires the update function information on the color copy function.

In step S205, the management server 2 extracts the records on the enabled functions that are indicated by the update function information acquired in step S204 from the records extracted from the device management table 42 in step S203. For example, if the update function information acquired in step S204 is on the color copy function, the records that contain the color copy function that is enabled are the records of the node 1 and the node 2. Therefore, the records of the node 1 and the node 2 are extracted.

In step S206, the management server 2 selects one of the node numbers of the extracted records.

In step S207, the management server 2 performs the update sequence management table update process. The update sequence management table update process is for registering the highest level of importance or the number of users in the update sequence management table 43 or updating them for the image processing device 3 having the node number selected in step S206. The details of the update sequence management table update process will be described later.

In step S208, the management server 2 determines whether all the node numbers are selected from the records extracted in step S205. If all the node numbers are selected, the management server 2 proceeds to step S209. If an unselected node number exists, the management server 2 returns to step S206 and repeats the process.

In step S209, the management whether all records are selected from the firmware information table 41. If all server 2 determines records are selected, the management server 2 proceeds to step S210. If an unselected record exists, the management server 2 returns to step S202 and repeats the process.

In step S210, the management server 2 sorts the update sequence management table 43 in sequence of the values indicating the levels of importance from the smallest value (in ascending sequence), that is, in sequence of the levels of importance from the highest level of importance.

In step S 211, the management server 2 sorts the update sequence management table 43 in sequence from the highest number of users (in descending sequence) for every level of importance.

In the above process, the update of the firmware program is not performed on the image processing device 3 in which all the update functions are disabled even if the model name thereof matches the model name registered in the firmware information table 41. However, the firmware update may be performed on such an image processing device 3 because the functions may be enabled later. In that case, the node number of such an image processing device 3 is registered at the end of the update sequence management table 43. This is because the priority of firmware update for such an image processing device 3 is low.

5-4. Update Sequence Management Table Update Process

Figure 8:
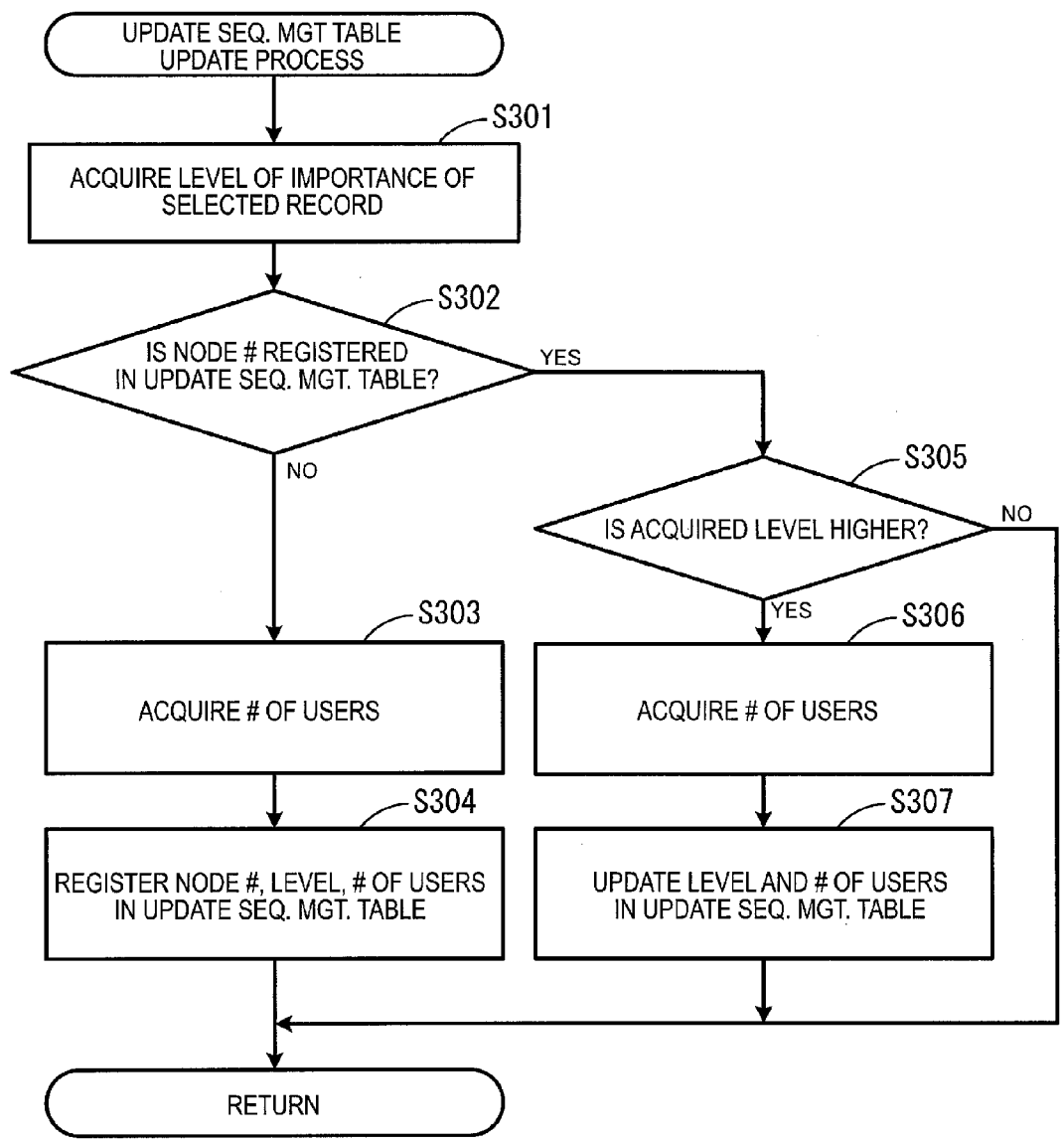
FIG. 8 is a flowchart illustrating a flow of an update sequence management table update process.

The update sequence management table update process performed in step S207 will be described with reference to FIG. 8.

In step S301, the management server 2 acquires the level of importance of the record selected in step S202 from the firmware information table 41. For example, if the record selected in step S202 is the record 1, the management server 2 acquires the level of importance of 2.

In step S302, the management server 2 determines whether the node number selected in step S206 is registered in the update sequence management table 43. In response to determining that the node number is not registered, the management server 2 proceeds to step S303. In response to determining that the node number is registered, the management server 2 proceeds to step S305.

In step S303, the management server 2 acquires the number of users who are authorized to use the update function indicated by the update function information that is acquired in step S204, from the record of the node number selected in step S206 from the device management table 42.

If the record 1 is selected in step S202, the function to be updated acquired in step S204 is the color copy function. If the record 1 is selected in step S206, the number of users who are authorized to use the color copy function is 35. Therefore, the number 35 is acquired for the number of users.

In step S304, the management server 2 registers the node number selected in step S206, the level of importance acquired in step S301, and the number of users acquired in step S303 in the update sequence management table 43 in association with each other.

For example, if the record 1 is selected in step S202 and the node 1 selected in step S206 is 1, the number 1, 2 and 36 are registered in the update sequence management table 43 for the node number, the level of importance, and the number of users, respectively.

In step S305, the management server 2 determines whether the level of importance acquired in step S301 is higher than the level of importance of the record having the node number (the node number selected in step S206) registered in the update sequence management table 43.

For example, assume that the record 1 is selected from the firmware information table 41 and a record containing the node number 1, the level of importance of 2, and the number of users of 35 is registered in the update sequence management table 43. Then, assume that record 2 is selected from the firmware information table 41 in step S202. In this case, the black-and-white copy function is acquired as an update function in step S204. In step S301, the level of importance of 1, which is the level of importance of the black-and-white copy function, is acquired.

In the device management table 42, the black-and-white copy function in the record of the node 1 is enabled. Therefore, the record is extracted again in step S205. In this case, if the node 1 is selected in step S206, the level of importance of the record of the node 1 in the update sequence management table 43 at that time is 2 as described above. Therefore, the management server 2 determines that the level of importance acquired in step S301 is higher.

The management server 2 proceeds to step S306 in response to determining that the level of importance acquired in step S301 is higher, otherwise the management server 2 terminates the process and returns to the update sequence determination process.

In S306, the management server 2 acquires the number of users who are authorized to use the update function acquired in step S204 from the record of the node number selected in step S206 from the device management table 42.

For example, if the record 2 is selected from the firmware information table 41 in step S202 as in the earlier example, the management server 2 acquires the black-and-white function in step S204. If the record 1 is selected in step S206, the management server 2 acquires the number 50 that is the number of users who are authorized to use the black-and-white copy function of the node 1 in step S306.

In step S307, the management server 2 updates the level of importance of the record of the node selected in step S206 with the level of importance acquired in step S301 in the update sequence management table 43. Furthermore, the management server 2 updates the number of uses in the record with the number of users acquired in step S306.

For example, in the example describe earlier, the level of importance and the number of users in the record of the node 1 are altered from 2 to 1 and from 35 to 50, respectively, in the update sequence management table 43.

6. Effects

With the update management program 32, the management server 2 determines the sequence of firmware updates on the image processing devices 3 with the latest firmware program according to the functions that are controlled by the respective firmware programs that are to be updated with the latest firmware program. More specifically, the management server 2 determines the sequence of firmware updates based on the functions controlled by the respective firmware programs that are to be updated with the latest firmware program and the predefined determination criteria such that the updates are performed in sequence from the image processing device 3 with the highest priority of update to the image processing device 3 with the lowest priority of update. With the update management program 32, the updates of firmware programs are performed in sequence from the image processing device 3 with the highest priority of update when the firmware updates are performed on multiple image processing devices 3.

With the update management program 32, the management server 2 determines the sequence of updates such that the updates are performed in sequence from the image processing device 3 in which the update function is enabled. If the function to be updated is enabled, the image processing device 3 has a high priority of update. Namely, with the update management program 32, the updates are performed in sequence from the image processing device 3 with the highest priority of update.

With the update management program 32, the management server 2 determines the sequence of updates such that the updates are performed in sequence from the image processing device 3 including the update function having the highest number of users who are authorized to use the function. If the number of users who are authorized to use the update function is higher, the image processing device 3 has a higher priority of update. Namely, with the update management program 32, the updates are performed in sequence from the image processing device 3 with the highest priority of update.

With the update management program 32, the management server 2 performs the updates in sequence from the image processing device 3 including the function that is to be updated and has the highest level of importance of update. If the importance of update is higher, the need of firmware update is higher. Namely, with the update management program 32, the updates are performed in sequence from the image processing device 3 with the highest level of importance of update.

Another Illustrative Aspect

Another illustrative aspect of the present invention will be described with reference to FIGS. 9A to 9C.

To perform the copy function, the image processing device 3 displays a setup screen and receives copy setting information from a user. The setting information may include a combination of parameters of the following setting items: the number of sheets; a percentage of enlargement/reduction; a paper size (A4, A3, B5 etc.); the number of colors (color copy/black-and-white copy); and an economy print (normal copy/eco copy).

In such a case, an administrator of the image processing device 3 can set default functions for the setting items, respectively. For example, if the eco copy is set for the economy print as a default function, the eco copy is displayed on the setup screen as a default parameter for the economy print. The default functions may be fixed factory default functions.

In general, the default functions tend to be used more often in comparison to other functions. The functions that are used more often are considered to have higher priorities of updates of the firmware programs. Therefore, the management server 2 according to this aspect determines an update sequence for updating firmware programs on the image processing devices 3 with the latest firmware program as follows.

(a) The management server 2 determines whether the update functions are default functions and the update sequence such that the image processing device 3 that has the default settings has a higher priority to update its control program than the image processing device 3 that does not have the default settings.

(b) The management server 2 determines the update sequence of the image processing devices 3 including the functions that are default functions based on the levels of importance of the updates such that the updates are performed on the image processing devices 3 including the functions having the higher levels of importance with higher priorities. The highest level of importance is the level of importance of update which is the highest among the levels of importance of updates of the update functions within each image processing device 3.

1. Tables Used for Firmware Update Process

A firmware information table 51 used in a firmware update process according to this aspect will be described with reference to FIG. 9A. In the firmware information table 51 illustrated in FIG. 9A, the levels of importance of the eco copy and the black-and-white are 1 and 2, respectively.

A default function table 52 illustrated in FIG. 9B is used as an alternative of the device management table 42 used in the previous example. Node numbers, model names, and default functions for the respective setting items are registered in the default function table 52.

Node numbers and the highest levels of importance are registered in an update sequence management table 53 illustrated in FIG. 9C. After records are registered in the update sequence management table 53 for the respective node numbers, the update sequence management table 53 is sorted in ascending sequence of the levels of importance from the lowest level and the sequence management table 53 is complete.

The model name registered in the firmware information table 51 is only MFP1. Therefore, the image processing device 3D having the node number 4, the model name of which is MFP2, is not registered in the update sequence management table 53.

2. Update Sequence Determination Process

Next, steps of an update sequence determination process according to this aspect different from the update sequence determination process of the previous example will be described with reference to FIG. 7.

The management server 2 according to this aspect extracts records, the model name of which matches the model name of the record selected in step S202, from the default function table 52.

In step S205, the management server 2 extracts records including the update function acquired in step S204 set as a default function from the records extracted in step S203. The numbers of uses are not registered in the update sequence management table 53 according to this aspect. Therefore, step S211 in FIG. 7 will not be performed.

If there is the image processing device 3 having the model name that matches the model name registered in the firmware information table 51 but not registered in the update sequence management table 53 (e.g., the image processing device 3C having the node number 3), the node number of the image processing device 3 is registered at the end of the update sequence management table 53 after the above-described process is performed. This step is performed because, for example, the update function of the image processing device 3C is not set as a default function but may be performed. This is the same in other aspects that will be described later.

3. Update Sequence Management Table Update Process

Steps of an update sequence management table update process according to this aspect different from the update sequence management table update process according to the previous example will be described with reference to FIG. 8.

The management server 2 according to this aspect does not perform step S303. In step S304, the management server 2 registers the node number selected in step S206 and the level of importance acquired in step S301 in an update sequence management table in association with each other.

The management server 2 does not perform step S306. In step S307, the management server 2 updates the level of importance of the record having the node number acquired in step S206 with the level of importance of the update function acquired in step S301.

4. Effects

With the update management program 32, the management server 2 determines the update sequence such that the updates are performed from the image processing device 3 in which the update function is registered as a default function. With the update management program 32, the updates are performed in sequence from the image processing device 3 having the higher priority of update for performing the updates of the firmware programs on the multiple image processing devices 3.

Another Illustrative Aspect

Another illustrative aspect will be described with reference to FIGS. 10A and 10B. A management server 2 according to this aspect determines an update sequence for performing firmware updates on the image processing devices 3 with the latest firmware program as follows.

(a) The management server 2 determines whether errors of the update functions have occurred in the image processing devices 3 and the update sequence such that the image processing device 3 that has the errors of the update functions has higher priority to update its control program than the image processing device 3 that does not have the errors of the update functions.

(b) The management server 2 determines the update sequence of the image processing devices 3 including the functions have the errors based on the levels of importance of the updates such that the updates are performed on the image processing devices 3 including the functions having the higher levels of importance with higher priorities. The highest level of importance is the level of importance of update which is the highest among the levels of importance of updates of the update functions within each image processing device 3.

(c) The management server 2 determines times of errors of the update function (times at which the errors occur in the update functions) in the image processing devices 3 and the update sequence such that the image processing device 3 that has earlier time of errors has a higher priority to update its control program than the image processing device 3 that has later time of errors.

1. Tables Used in Firmware Update Process

Tables used in a firmware update process according to this aspect will be described with reference to FIGS. 10A and 10B. A firmware information table is not illustrated. The firmware information table according to this aspect is the same as the firmware information table 41 in the previous example.

An error information management table 61 is an alternative of the device management table 42 in the previous example. Node numbers, model names, functions having errors, and error occurrence time are registered in the error information management table 61. If an error occurs, the image processing device 3 sends error information to the management server 2. The management server 2 receives the error information and registers the error information in the error information management table 61. Alternatively, the management server 2 sends a query to the image processing devices 3 to receive error information and creates the error information table 61 from the received error information.

Node numbers, the highest levels of importance, and error occurrence time are registered in an update sequence management table 62 illustrated in FIG. 10B. After records having the node numbers are registered, the update sequence management table 62 is sorted in ascending sequence of the levels of importance from the record having the lowest level of importance. The update sequence management table 62 is further sorted in sequence from the record having the oldest error occurrence time among the records having the same level of importance. As a result, the update sequence management table 62 illustrated in FIG. 10B is created.

2. Update Sequence Determination Process

Steps of an update sequence determination process according to this aspect different from the steps of the update sequence determination process in the previous example will be described with reference to FIG. 7. In step S203, a management server 2 according to this aspect extracts records having model names that match the model name of the record selected in step S202 from the error information management table 61.

In step S205, the management server 2 extracts records including the update function acquired in step S204 and has an error from the records extracted in step S203.

In step S211, the management server 2 sorts the update sequence management table 62 based on the error occurrence times from the earliest error occurrence time for each level of importance.

3. Update Sequence Management Table Update Process

Steps of an update sequence management table update process according to this aspect different from the steps of update sequence management table update process in the previous example are described with reference to FIG. 8.

In step S303, the management server 2 acquires times of occurrences of the errors of the update function acquired in step S204 from the record including the node number selected in step S206 from the error information management table 61.

In step S304, the management server 2 registers the node number selected in step S206, the level of importance acquired in step S301, and the error occurrence time acquired in step S303 in the update sequence management table in association with each other.

In step S306, the management server 2 acquires the error occurrence times of the update function that is acquired in step S204 from the record including the node number selected in step S206 from the error information management table 61.

In step S307, the management server 2 updates the level of importance in the record including the node number acquired in step S206 with the level of importance of the update function acquired in step S301 in the update sequence management table 62. The management server 2 further updates the error occurrence time in the record with the error occurrence time acquired in step S306.

4. Effects

With the update management program 32, the management server 2 determines the update sequence such that the firmware updates are performed on the image processing devices 3 including the update functions having errors with higher priorities. If the update functions have errors, the functions have higher priorities of update. With the update management program 32, the firmware program on the image processing device 3 having a higher priority of update is updated earlier than that on the other image processing devices 3.

With the update management program 32, the management server 2 determines the update sequence such that the firmware updates are performed on the image processing devices 3 including the update functions, the error occurrence times of which are earlier, with higher priorities. If the error occurrence time is earlier, the user may have been waiting for the firmware update longer. Therefore, such image processing devices 3 have higher priorities of update. With the update management program 32, the firmware program on the image processing device 3 having a higher priority of update is updated earlier than that on the other image processing devices 3.

Another Illustrative Aspect

Another illustrative aspect will be described with reference to FIGS. 11A to 12B. Each image processing device 3 includes a preset function for scheduling execution of the functions. With the preset function, the image processing device 3 receives an input from a user about a time at which the user wants to execute the function from the user and executes the function at the time.

The management server 2 according to this aspect determines the update sequence as follows for updating the firmware programs on the image processing devices 3 with the latest firmware program.

(a) The management server 2 determines whether execution of the update functions is scheduled for every image processing device 3 and set the image processing devices including the functions, the execution of which is scheduled, with higher priorities in the update sequence.

(b) The management server 2 determines the update sequence of the image processing devices 3 including the functions, the execution of which is scheduled, such that the updates are performed on the image processing devices 3 including the functions having the higher levels of importance with higher priorities. The highest level of importance is the level of importance of update which is the highest among the levels of importance of updates of the update functions within each image processing device 3.

(c) If the image processing device 3 includes the function having the highest level of importance the same as that of the other image processing device 3, the management server 2 determines the update sequence of these image processing devices 3 based on the scheduled execution times. Namely, the management server 2 determines the update sequence such that the update is performed on the image processing device 3 including the function, the scheduled execution time of which is earlier than the other.

(d) A difference between the scheduled execution time of the update function and the current time may be longer than a duration required for the update of the firmware program. In such a case, the management server 2 determines the update sequence such that the update of the firmware program is performed after the execution of the function is complete.

1. Tables Used in Firmware Update Process

A firmware information table 71 and a scheduled function execution table 72 will be described with reference to FIGS. 11A and 11B. A model name, a firmware version, a duration required for firmware update, update functions, and levels of importance are registered in the firmware information table 71. The scheduled function execution table 72 is an alternative of the device management table 42 in the previous example. Node numbers, model names, functions that are scheduled to be executed, and scheduled execution time are registered in the scheduled function execution table 72.

An update sequence management table 73 according to this aspect will be described with reference to FIGS. 12A and 12B. Node numbers, the highest levels of importance, and scheduled time are registered in the update sequence management table 73. After records for the respective node numbers are registered in the update sequence management table 73, the management server 2 sorts the update sequence management table 73 based on the levels of importance from the lowest level of importance. The management server 2 further sorts the update sequence management table 73 based on the scheduled execution times from the earliest execution time for the records including the same highest level of importance. As a result, the update sequence management table 73 illustrated in FIG. 12A is created.

Some of the records may include the scheduled time, a difference between which and the scheduled time is longer than the duration required for firmware update in the firmware information table 71. In such a case, the firmware update may not be complete before the function is executed. Therefore, the management server 2 moves such a record to the bottom of the records including the functions scheduled to be executed in the update sequence management table 73. As a result, the contents of the update sequence management table 73 are altered as in the update sequence management table 73 illustrated in FIG. 12B from the contents of the update sequence management table 73 illustrated in FIG. 12A.

Instead of moving the record to the bottom of the list, the record may be moved to anywhere in the list as long as the firmware update is complete before the function is executed such that the firmware program is to be updated at the earliest timing.

2. Update Sequence Determination Process

Steps of an update sequence determination process according to this aspect different from the steps of the update sequence determination process in the previous example will be described with reference to FIG. 7.

In step S203, the management server 2 extracts records including the model names that match the model name included in the record selected in step S202 from the scheduled function execution table 72.

In step S205, the management server 2 extracts records including the function to be updated acquired in step S04 and scheduled to be executed from the records extracted in step S203.

In step S211, the management server 2 sorts the scheduled function execution table 72 based on the scheduled execution time from the earliest time for the functions having the same highest level of importance. The update sequence determination process according to this aspect further include step S212, which is performed after step S211.

In step S212, the management server 2 moves the record including the scheduled execution time, the difference of which with the current time is within the duration required for the firmware update to the bottom of the records of the image processing devices 3 including the update functions, the execution of which is scheduled.

3. Update Sequence Management Table Update Process

Steps of an update sequence management table update process according to this aspect different from the steps of update sequence management table update process in the previous example will be described with reference to FIG. 8.

In step S303, the management server 2 acquires the scheduled execution time of the update function acquired in step S204 from the record including the node number selected in step S206 from the scheduled function execution table 72.

In step S304, the management server 2 registers the node number selected in step S206, the level of importance acquired in step S301, and the scheduled execution time acquired in step S303 in the update sequence management table in association with each other.

In step S306, the management server 2 acquires the scheduled execution time of the update function acquired in step S204 from the record including the node number selected in step S206 from the scheduled function execution table 72.

In step S307, the management server 2 updates the level of importance in the record including the node number acquired in step S206 in the update sequence management table 73 with the level of importance of the update function acquired in step S301. The management server 2 further updates the scheduled execution time in the record with the scheduled execution time acquired in step S306.

Effects

With the update management program 32, the management server 2 determines whether the update functions are scheduled to be executed in the image processing devices 3, respectively, and the update sequence such that the image processing device 3 that has the update functions that are scheduled to be executed has a higher priority than the image processing device 3 that does not have the update function that are scheduled to be executed. If the functions are scheduled to be executed, the functions are most likely to be executed. Therefore, the functions have high priorities of firmware updates. With the update management program 32, the firmware updates are performed on the image processing devices 3 having higher priorities of updates with higher priorities during the firmware updates on multiple image processing devices 3.

With the update management program 32, the management server 2 determines schedule times at which the update functions are scheduled to be executed in the image processing devices 3, respectively, and the update sequence such that the image processing device 3 that has the earlier schedule time has a higher priority than the image processing device 3 that has the later schedule time.

With the update management program 32, the management server 2 determines time differences between the current time and the scheduled execution time in the image processing devices 3, respectively, and the update sequence such that the update of the control program of the image processing device 3 that has the time difference within a time required for the update of its control program is performed after the execution of the update function is complete.

Other Illustrative Aspects

The present invention is not limited to the illustrative aspects explained in the above description with reference to the drawings. The following illustrative aspects may be included in the technical scope of the present invention, for example.

The management server 2 may be configured to determine the numbers of times at which execution of the update functions are permitted in the image processing devices 3, respectively, and set the image processing devices including the function that have the higher numbers of the execution permitted times with higher priorities in the update sequence. The number of times at which execution of the update functions are permitted is an example of the amount of permitted execution times for the function.

Examples of the numbers of times include the number of times at which instructions to make copies using the copy function are input and the number of copies. If the number of execution permitted time is high, the demand of the function is high. Therefore, the priority of the firmware update is high. With the configuration described above, the firmware updates are performed on the image processing devices 3 having the higher priorities of the updates with higher priorities.

The management server 2 may be configured to determine execution frequencies of the update functions in the image processing devices, respectively, and set the image processing devices including the functions that have the higher frequencies of use with higher priorities in the update sequence.

The frequencies of use refer to the numbers of times at which the functions are performed within 24 hours up to the current time. If the frequency of use is high, the demand of the function is high. Therefore, the priority of the firmware update is high. With the configuration described above, the firmware updates are performed on the image processing devices 3 having the higher priorities of the updates with higher priorities.

The management server 2 may be configured to determine frequencies of errors of the update functions in the image processing devices, respectively, and determine the update sequence such that the image processing device that has a higher frequency of errors of the update functions has a higher priority to update its control program than another image processing device that has a lower frequency of errors of the update functions.

The frequencies of occurrences of errors refer to the numbers of occurrences of the errors within 24 hours up to the current time. If the frequency of occurrence of error is high, the demand of the function is high. Therefore, the priority of the firmware update is high. With the configuration described above, the firmware updates are performed on the image processing devices 3 having the higher priorities of the updates with higher priorities.

The management server 2 may be configured to determine then numbers of jobs that are scheduled to be executed, and set the image processing devices including the higher numbers of jobs with higher priorities in the update sequence. Examples of the jobs include print jobs. For example, multiple print jobs may be scheduled to be executed in each image processing device 3. If print functions controlled by the respective firmware programs that are to be updated with the latest firmware program, the firmware updates may be performed from the image processing device 3 in which the number of scheduled print jobs is high.

The management server 2 may be configured to determine the update sequence based only on the levels of importance of updates but not on a combination of the levels of importance and the functions that are enabled. For example, there may be a multi-function device A including a color copy function and a multi-function device B including a black-and-white copy function but not a color copy function. The latest firmware program is provided for updating the color copy function and the black-and-white function. The level of importance of update of the color copy function is 1. The level of importance of update of the black-and-white copy function is 2. In such a case, the firmware program on the multi-function device A may be updated prior to the update of the firmware program on the multi-function device B regardless of whether the color copy function of the multi-function device A is enabled. Not all the image processing devices 3 may be configured to enable or disable the functions. If the image processing devices 3 are not configured to enable or disable the functions, the determinations of whether the functions are enabled or disabled by the management server 2 are not necessary for such image processing devices 3.

In some of the illustrative aspects described earlier, the management server 2 determines the update sequence without referring to whether the functions are enabled or disabled. The management server 2 may be configured to refer to whether the functions are enabled or disabled in the determination of the update sequence in such illustrative aspects.

The number of users may override the level of importance of update when the management server 2 determines the update sequence based on the number of users and the level of importance. Among the update functions in each image processing device 3, the function having the highest number of users who are authorized to use the function may be determined. The number of users of the function is determined as the highest number of users in the image processing device 3. The management server 2 may be configured to set the image processing devices 3 including larger highest numbers of users with higher priorities in the update sequence. The management server 2 may be configured to set the image processing devices 3 including the functions the higher priority of update with higher priorities if the highest numbers of users are the same.

The management server 2 may be configured to determine the update sequence without referring to the levels of importance of update.

In each image processing device 3, the number of enabled functions among the update functions may be determined as the number of the update functions in the image processing device 3. In such a case, the management server 2 may be configured to set the image processing devices 3 having the higher numbers of the update functions with higher priorities.

Among the update functions in each image processing device 3, the function having the highest number of users who are authorized to use the function may be determined. The number of users of the function is determined as the highest number of users in the image processing device 3. The management server 2 may be configured to set the image processing devices 3 including larger highest numbers of users with higher priorities in the update sequence. The numbers of execution permitted times or the frequencies of updates may be used instead of the numbers of users.

In each image processing device 3, the numbers of default functions among the update functions may be determined as the numbers of default functions in the image processing device 3. In such a case, the management server 2 may be configured to set the image processing devices 3 having the higher numbers of default functions with higher priorities in the update sequence.

In each image processing device 3, the number of functions have errors among the update functions may be determined as the number of error functions in the image processing device 3. In such a case, the management server 2 may be configured to set the image processing devices 3 having the higher numbers of error functions with higher priorities in the update sequence.

In each image processing device 3, the numbers of functions that are scheduled to be executed among the update functions may be determined as the number of functions scheduled to be executed in the image processing device 3. In such a case, the management server 2 may configured to set the image processing devices 3 having the higher numbers of functions scheduled to be executed with higher priorities in the update sequence.

The management server 2 may be configured to determine the update sequence based on a combination of the numbers of users, default functions, occurrences of errors, and scheduled function execution. For example, in each image processing device 3, the highest number of users who are authorized to use the function among the update functions may be determined as the highest number of users in the image processing device 3. In such a case, the management server 2 may be configured to set the image processing devices 3 having the larger highest numbers of users with higher priorities in the update sequence. The management server 2 may be configured to set the image processing devices 3 including the function having the highest number of users and set as a default function with high priority in the update sequence when the highest numbers of users are the same.

The management server 2 may be configured to determine the update sequence without referring to the levels of importance of updates, the enabled functions, the number of users, the default functions, the numbers of occurrences of errors, and the scheduled function execution. For example, the management server 2 may be configured to determine the update sequence based on the numbers of update functions. There may be a multi-function device A including the color copy function and the email function and a multi-function device B including a color copy function but not an email function. The latest firmware program may be provided for updating the color copy function and the email function. In such a case, the multi-function device A includes two update functions and the multi-function device B includes one function to be updated. Therefore, the management server 2 may determine the update sequence such that the update is performed on the multi-function device A prior to the multi-function device B. If the number of update functions is high, the priority of the update of the image processing is high.

The management server 2 may be configured to acquire the records from the firmware information table 41 in step S202 in descending sequence from the record including the higher level of importance. In such a case, the management server 2 may be configured to exclude the node number acquired in step S206 from candidates for selection of the node numbers if step S206 is performed again after a different record is acquired in step S202. This is because the highest level of importance is registered in the update sequence management table 43 in association with the record. In such a case, steps S302 and S305 to S307 illustrated in FIG. 8 are not required.

Alternatively, the management server 2 may be configured to resister the records in the firmware information table 41 in descending sequence from the highest level of importance. With this configuration, the process for acquiring the records in descending sequence from the highest level of importance can be performed with ease.

Pieces of the error information registered in the error information management table 61 may not be grouped by function. The management server 2 may be configured to determine whether the image processing devices have the errors that affect the update functions, respectively, and the update sequence such that the image processing device 3 that has the errors that affect the update functions has a higher priority to update its control program than the image processing device 3 that does not have the errors that affect the update function.

For example, the management server 2 may be configured to determine whether a temperature in the multi-function device is equal to or higher than a reference temperature and an occurrence of an error in response to determining that the temperature is equal to or higher than the reference temperature. The management server 2 may be further configured to register error information that indicates the temperature is equal to or higher than the reference temperature. The management server 2 may be further configured to determine that a proper print job by the print function is not ensured when the temperature is equal to or higher than the reference temperature. If the print function is enabled in the multi-function device in which the error is occurring, the multi-function device is determined as a device in which an error that affects the function is occurring. In this case, the management server 2 may be configured to perform the firmware update on the multi-function device prior to the multi-function devices in which no error occurs or having an error but the print function is disabled. This is because the error may be corrected when the print function is updated.

If the multi-function device includes a telephone function in addition to the facsimile function and a common modem for the telephone function and the facsimile function, the management server 2 may be configured to determine whether the common modem has an error. The management server 2 may be configured to register error information that indicates an error of the modem. In this case, the management server 2 may be configured to preform the firmware update on the multi-function device having the error prior to the multi-function devices having no errors. This is because the error may be corrected when the facsimile function or the telephone function is updated.

The management server 2 may be configured to determine whether an image sensor for scanning images has an error and to register error information that indicates the error of the image sensor. If the image sensor has an error, the image scanner function or the copy function that uses the image sensor may be affected. The management server 2 may be configured to perform the firmware update on the multi-function device having the error prior to the multi-function devices having no errors. This is because the error may be corrected when the image scanner function or the copy function is updated.

What is claimed is:

1. A non-transitory computer readable medium storing an update management program, the update management program causing an update of a control program, which is installed on a plurality of image processing devices, the update management program, when executed by a processor, causing a computer to:
    acquire an update program and update function information regarding functions to be updated by the update program from a firmware distribution server;
    acquire device function information regarding functions of each image processing device from each image processing device, each image processing device having a plurality of functions;
    transmit the update program to each image processing device;
    determine an update sequence of timing for causing each image processing device to update its control program, based on the acquired update function information and the acquired device function information; and
    cause each image processing device to update its control program by executing the transmitted update program in accordance with the determined update sequence,
    wherein the device function information is information of executable functions of each image processing device,
    wherein the update management program, when executed by the processor, further causes the computer to:
        determine whether each image processing device is able to execute the functions to be updated by the update program, based on the acquired update function information and the acquired device function information; and
        determine the update sequence such that each image processing device which is able to execute the functions has a higher priority to update its control program than each image processing device which is unable to execute the functions, and
    wherein to transmit the update program includes:
        if the update sequence is determined to be a first update sequence, transmit the update program to a first image processing device after the update program has been sent to a second image processing device; and
        if the update sequence is determined to be a second update sequence, send the update program to the second image processing device after the update program has been sent to the first image processing device.

2. The non-transitory computer readable medium according to claim 1,
    wherein the device function information is information of amounts of permitted execution times for the functions, and
    wherein the update management program, when executed by the processor, further causes the computer to:
        determine an amount of permitted execution times for the functions in each image processing device based on the acquired update function information and the acquired device information; and
        determine the update sequence such that each image processing device which has greater amount of permitted execution times for the functions has a higher priority to update its control program than each image processing device which has a smaller amount of permitted execution times for the functions.

3. The non-transitory computer readable medium according to claim 1,
    wherein the device information is information of amounts of permitted users to execute the functions, and
    wherein the update management program, when executed by the processor, further causes the computer to:
        determine an amount of permitted users to execute the functions in each image processing device based on the acquired update function information and the acquired device information; and
        determine the update sequence such that each image processing device which has a greater amount of permitted users to execute the functions has a higher priority to update its control program than each image processing device which has a smaller amount of permitted users to execute the functions.

4. The non-transitory computer readable medium according to claim 1,
    wherein the device function information is information of errors of the functions to be updated by the update program occurring on each image processing device, and
    wherein the update management program, when executed by the processor, further causes the computer to:
        determine whether an error of the functions to be updated by the update program has occurred in each image processing device; and
        determine the update sequence such that each image processing device which has the errors of the functions to be updated by the update program has a higher priority to update its control program than each image processing device which does not have the errors of the functions to be updated by the update program.

5. The non-transitory computer readable medium according to claim 4,
wherein the device function information is information of frequencies of errors of the functions to be updated by the update program having occurred on each image processing device, and
wherein the update management program, when executed by the processor, further causes the computer to:
determine a frequency of errors of the functions to be updated by the update program having occurred on each image processing device; and
determine the update sequence such that each image processing device which has a higher frequency of errors of the functions to be updated by the update program has a higher priority to update its control program than each image processing device which has a lower frequency of errors of the functions to be updated by the update program.

6. The non-transitory computer readable medium according to claim 4,
wherein the device function information is information of times of errors of the functions to be updated by the update program having occurred on each image processing device, and
wherein the update management program, when executed by the processor, further causes the computer to:
determine the times of errors of the functions to be updated by the update program; and
determine the update sequence such that each image processing device which has earlier time of errors of the functions to be updated by the update program has a higher priority to update its control program than each image processing device which has later time of errors of the functions to be updated by the update program.

7. The non-transitory computer readable medium according to claim 4,
wherein the device function information is information of errors which affect the functions to be updated by the update program occurring on each image processing device, and
wherein the update management program, when executed by the processor, further causes the computer to:
determine whether each image processing device has the errors which affect the functions to be updated by the update program; and
determine the update sequence such that each image processing device which has the errors which affect the functions to be updated by the update program has a higher priority to update its control program than each image processing device which does not have the errors which affect the functions to be updated by the update program.

8. The non-transitory computer readable medium according to claim 1,
wherein the device function information is information of execution of the functions to be updated by the update program being scheduled in each image processing device, and
wherein the update management program, when executed by the processor, further causes the computer to:
determine whether the execution of the functions to be updated by the update program is scheduled in each image processing device; and
determine the update sequence such that each image processing device in which the execution of the functions to be updated by the update program is scheduled has a higher priority to update its control program than each image processing device in which the execution of the functions to be updated by the update program is not scheduled.

9. The non-transitory computer readable medium according to claim 8, wherein the update management program, when executed by the processor, further causes the computer to:
determine scheduled times at which the functions to be updated by the update program is scheduled to be executed in each image processing device; and
determine the update sequence such that each image processing device which has an earlier schedule time has a higher priority than each image processing device which has a later schedule time.

10. The non-transitory computer readable medium according to claim 8, wherein the update management program, when executed by the processor, further causes the computer to:
determine a time difference between current time and a scheduled time in each image processing device; and
determine the update sequence such that an update of the control program of each image processing device which has the time difference within a time required for the update of its control program is performed after the execution of the functions to be updated by the update program is complete.

11. The non-transitory computer readable medium according to claim 1, wherein the update management program, when executed by the processor, further causes the computer to:
acquire importance of the functions to be updated by the update program from a firmware distribution server; and
determine the update sequence such that each image processing device which has higher importance of the functions to be updated by the update program has a higher priority than each image processing device which has lower importance of the functions to be updated by the update program.

12. A non-transitory computer readable medium storing an update management program, the update management program causing an update of a control program, which is installed on a plurality of image processing devices, the update management program, when executed by a processor, causing a computer to:
acquire an update program and update function information regarding functions to be updated by the update program from a firmware distribution server;
acquire device function information regarding functions of each image processing device from each image processing device;
transmit the update program to each image processing device;
determine an update sequence of timing for causing each image processing device to update its control program, based on the acquired update function information and the acquired device function information; and
cause each image processing device to update its control program by executing the transmitted update program in accordance with the determined update sequence
wherein the device function information is information of default settings of each image processing device, and
wherein the update management program, when executed by the processor, further causes the computer to:

determine whether each image processing device has default settings for executing the functions to be updated by the update program by default, based on the acquired update function information and the acquired device function information; and determine the update sequence such that each image processing device which has the default settings has a higher priority to update its control program than each image processing device which does not have the default settings.

13. The non-transitory computer readable medium according to claim 12, wherein each image processing device has a plurality of functions, and wherein to transmit the update program includes:

if the update sequence is determined to be a first update sequence, transmit the update program to a first image processing device after the update program has been sent to a second image processing device; and if the update sequence is determined to be a second update sequence, send the update program to the second image processing device after the update program has been sent to the first image processing device.

14. A non-transitory computer readable medium storing an update management program, the update management program causing an update of a control program, which is installed on a plurality of image processing devices, the update management program, when executed by a processor, causing a computer to:

acquire an update program and update function information regarding functions to be updated by the update program from a firmware distribution server;

acquire device function information regarding functions of each image processing device from each image processing device, each image processing device having a plurality of functions;

determine an update sequence of timing for causing each image processing device to update its control program, based on the acquired update function information and the acquired device function information;

transmit the update program to each image processing device including:

if the update sequence is determined to be a first update sequence, send the update program to a first image processing device after the update program has been sent to a second image processing device; and if the update sequence is determined to be a second update sequence, send the update program to the second image processing device after the update program has been sent to the first image processing device; and cause each image processing device to update its control program by executing the transmitted update program in accordance with the determined update sequence, wherein the device function information is information of execution frequencies of the functions, and wherein the update management program, when executed by the processor, further causes the computer to:

determine the execution frequencies of the functions based on the acquired update function information and the acquired device information; and determine the update sequence such that each image processing device which has a higher execution frequency of the functions has a higher priority to update its control program than each image processing device which has a lower execution frequency of the functions.

15. An update management device comprising:

a communication interface to which a plurality of image processing devices are connectable through a network;

a memory storing an update management program for causing an update of control programs installed on each of the image processing devices; and a processor configured to execute the update management program to cause the update management device to:

acquire an update program and update function information regarding functions to be updated by the update program from a firmware distribution server;

acquire device function information regarding functions of each image processing device from each image processing device, each image processing device having a plurality of functions;

transmit the update program to each image processing device;

determine an update sequence of timing for causing each image processing device to update its control program based on the acquired update function information and the acquired device function information; and cause each image processing device to update its control program by executing the transmitted update program in accordance with the determined update sequence, wherein the device function information is information of executable functions of each image processing device, and wherein the update management program, when executed by the processor, further causes the update management device to:

determine whether each image processing device is able to execute the functions to be updated by the update program, based on the acquired update function information and the acquired device function information; and determine the update sequence such that each image processing device which is able to execute the functions has a higher priority to update its control program than each image processing device which is unable to execute the function, and wherein to transmit the update program includes:

if the update sequence is determined to be a first update sequence, transmit the update program to a first image processing device after the update program has been sent to a second image processing device; and if the update sequence is determined to be a second update sequence, send the update program to the second image processing device after the update program has been sent to the first image processing device.

* * * * *